United States Patent [19]
McNamara

[11] Patent Number: 5,875,678
[45] Date of Patent: Mar. 2, 1999

[54] POWER WORK ARM WITH DUAL ACTION SHOCK ABSORBER

[75] Inventor: Jeffrey S. McNamara, Grosse Ile, Mich.

[73] Assignee: UNOVA IP Corp., Beverly Hills, Calif.

[21] Appl. No.: 890,068

[22] Filed: Jul. 9, 1997

[51] Int. Cl.⁶ .............................. B25J 18/00; F16H 21/16
[52] U.S. Cl. .............................. 74/105; 74/106; 74/526; 901/15; 901/27; 414/719
[58] Field of Search ............. 74/105, 106, 526; 901/15, 22, 11, 27; 414/719

[56] References Cited

U.S. PATENT DOCUMENTS

| | | | |
|---|---|---|---|
| 3,395,813 | 8/1968 | Bruce et al. | 414/719 |
| 4,497,461 | 2/1985 | Campbell | 74/526 |
| 4,547,110 | 10/1985 | Davidson | 414/22 |
| 5,216,930 | 6/1993 | McNamara | 74/469 |
| 5,772,385 | 6/1998 | Huntoon et al. | 414/408 |

Primary Examiner—Charles A. Marmor
Assistant Examiner—William C. Joyce
Attorney, Agent, or Firm—Barnes, Kisselle,Raisch, Choate, Whittemore & Hulbert, P.C.

[57] ABSTRACT

A device with a pivoting work arm for carrying and positioning a tool which is moved by a modified Watts linkage powered by a linear actuator is provided with shock absorption adjacent both the fully extended and fully retracted work arm positions. The modified Watts linkage engages a pawl which rotates a lever arm in the same direction to actuate the same shock absorber(s) when the work arm is moved to both its fully extended and fully retracted positions.

11 Claims, 3 Drawing Sheets ial, provides shock ad-
POWER WORK ARM WITH DUAL ACTION SHOCK ABSORBER

FIELD OF THE INVENTION

This invention relates to an apparatus for positioning a tool or the like and more particularly to an apparatus having a movable work arm.

BACKGROUND OF THE INVENTION

There are many previously known devices for positioning tools, welding guns and the like for mass production machining and assembly operations. Some previously known lift and carry workpiece transfer mechanisms have used a so called Watts linkage drive to raise and lower the workpieces.

A Watts linkage is a three link kinematic mechanism which has three long links pivotally connected together at adjacent ends with the remaining ends of two of the links pivoted about spaced apart and fixed pivot points. The links are constructed and arranged in a geometry that produces an essentially linear reciprocating motion of the center of the middle link. It is well understood that in a Watts linkage the links must be relatively long to produce this linear motion. Further, because the links do not move in a true straight line, a Watts linkage is not driven or powered by an actuator producing straight line or rectilinear motion.

The prior device disclosed in U.S. Pat. No. 5,216,930, utilizes a modified Watts linkage powered by an actuator having a straight line motion. While this device has been effective at powering the work arm with a linear actuator, it provides shock adsorption at only one end of the path of the work arm movement. Thus, at the end of the work arm movement where no shock absorption is provided, stresses can result on the system from the abrupt stoppage of the work arm which effects the durability and reliability of the system.

SUMMARY OF THE INVENTION

Pursuant to this invention, a modified Watts linkage interacts with the same shock absorber(s) adjacent the fully extended and fully retracted positions of the linkage system and the work arm. The work arm is moved in an arc by the Watts mechanism which is powered by an actuator having a generally true straight line motion.

Preferably, to provide shock absorption for the work arm as it reaches its fully extended and fully retracted positions, the Watts mechanism interacts with a pivoted link adjacent opposite sides of its pivot to move the link in the same direction to engage the shock absorber as the Watts mechanism and work arm move to both fully extended and fully retracted positions. More preferably, a pawl is provided which interacts with the Watts mechanism and engages the pivoted link to actuate the shock absorber.

Objects, features and advantages of this invention are to provide a device having a moveable work arm for positioning a tool which provides pivoted movement of the work arm utilizing a simple linear actuator, provides shock adsorption adjacent each end of the path of movement of the work arm, provides a smooth and yet relatively rapid movement of the arm to its retracted and extended positions, utilizes the same shock absorber in both positions, and is compact, highly reliable, rugged, durable, of relatively simple design and economical manufacture and assembly, has in-service a long useful life and requires little maintenance.

BRIEF DESCRIPTION OF THE DRAWINGS

These and other objects, features and advantages of this invention will be apparent from the following detailed description of the preferred embodiment and best mode, appended claims and accompanying drawings in which:

DETAILED DESCRIPTION OF THE PREFERRED EMBODIMENT

Figure 1:
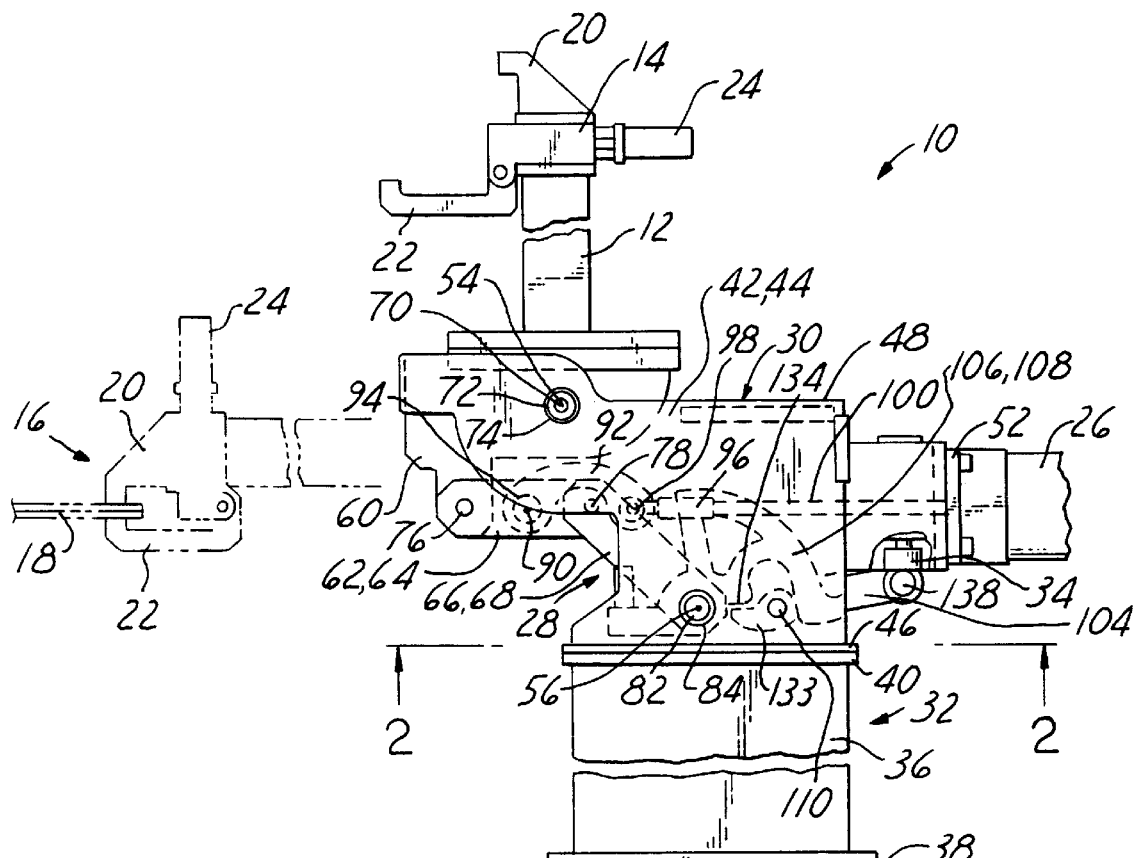
FIG. 1 is a side view of a device embodying this invention with a pivotally moveable work arm and a linear actuator.
Figure 2:
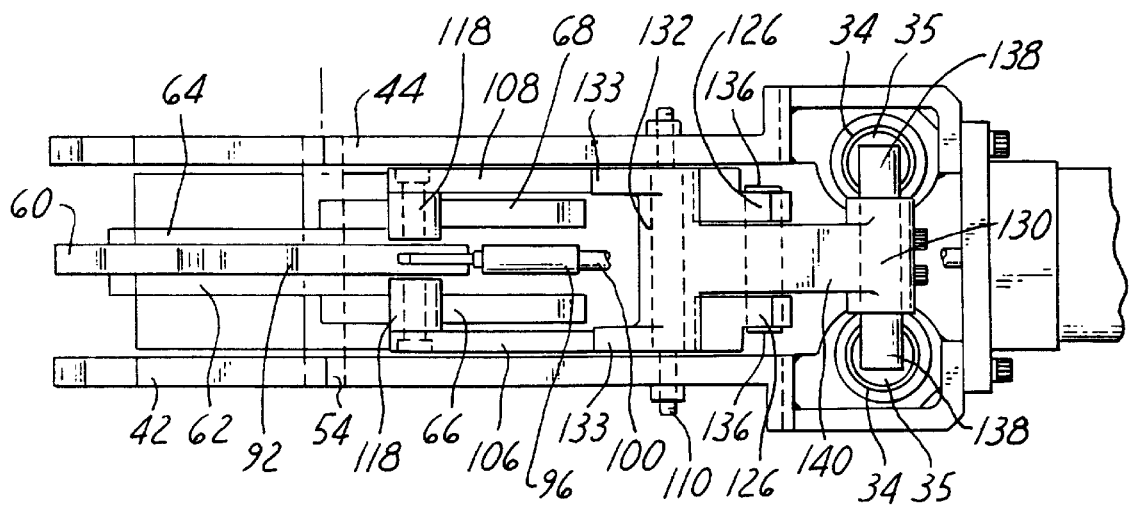
FIG. 2 is a sectional view taken along the line 2—2 of FIG. 1.

Referring in more detail to the drawings, FIG. 1 illustrates a power work arm device 10 embodying this invention with a work arm 12 pivotally movable to extended and retracted positions to move a clamp 14 or other tool into and out of a work station 16. In the work station 16 a pair of steel sheets 18 are held together by the clamp 14. The clamp 14 has a pair of arms 20, 22 providing a backup 20 and a press foot 22 between which the sheets 18 are clamped. The lever arm 22 is pivotally mounted and actuated by a drive cylinder 24 to engage the steel sheets 18 and thereby hold them in the correct position for an assembly operation such as welding.

The work arm 12 is driven by a preferably air actuated cylinder 26 through a linkage assembly 28 received in a housing 30 mounted on a pedestal 32. To ensure smooth movement of the arm 12 into and out of its fully extended position, it is operably connected through the linkage 28 to a shock absorber 34. The shock absorber 34 has a plunger 35 slidably received in a housing and yieldably biased by a spring towards its extended position. Displacement of the plunger 35 compresses the spring to provide shock absorption to the system.

The pedestal 32 has a support column 36 fixed at one end to a base plate 38 and at the other end to a mounting plate 40 to which the housing 30 is secured. The housing 30 has side plates 42, 44 joined by a base plate 46 and a preferably H-shaped top plate 48. The top plate 48 provides clearance for articulation of the linkage assembly 28. The air cylinder 26 is mounted on an end plate 52 attached to the side plates 42, 44. The linkage assembly 28 is carried and retained within the housing 30 by a first pivot 54 and a second pivot 56 each fixed to the side plates 42, 44.

The work arm 12 is moved to its extended and retracted positions by a modified Watts linkage assembly 28 having a first link 60 to which the work arm 12 is attached for movement in unison therewith, a pair of second links 62, 64 and a pair of third links 66, 68. The first link 60 is pivotally mounted in the housing 30 by a pivot shaft 70 journalled for rotation in a pair of bearings 72 received in collars 74 fixed to the side plates 42, 44. The second links 62, 64 are pivotally connected adjacent one end to the first link 60 by a pivot pin 76 and pivotally connected adjacent the other end to the pair of third links 66, 68 by another pivot pin 78. Adjacent the other end, the third links 66, 68 are pivoted on a pin 82 journalled for rotation in bearings 84 received in the third links 66, 68 and fixed to the side plates 42, 44. All of these links 60, 62, 64, 66, 68 are relatively short, preferably each of substantially the same length and each has a longitudinal length between the centers of its pivots which is less than 10 inches, desirably 3 to 6 inches and more desirably about 3½ to 4½ inches.

To accommodate the arcuate movement of a midpoint 90 of the second links 62, 64, they are operably connected to the air cylinder 26 through a fourth link 92. The fourth link 92 is pivotally connected adjacent one end to the midpoint 90 of the pair of second links 62, 64 by a pivot pin 94 and is pivotally connected adjacent the other end to an extension bar 96 by a pivot pin 98. The other end of the extension bar 96 is rigidly connected to the piston rod 100 of the air cylinder 26 for movement in unison therewith. To provide clearance for the pivotal connection 78 between the second 62, 64 and third links 66, 68, the fourth link 92 is preferably generally U-shaped. Preferably this fourth link 92 is also relatively short and has a longitudinal length between the centers of its pivots which is not greater than about 8 inches, desirably to 3 to 6 inches, and preferably about 3½ to 4½ inches. This actuator and linkage assembly is disclosed in U.S. Pat. No. 5,216,930 the disclosure of which is incorporated herein by reference and hence will not be described in further detail.

In accordance with this invention, to ensure smooth and rapid movement of the work arm 12 adjacent its fully extended and fully retracted positions, the shock absorber 34 is operably connected to the linkage assembly 28 through a fifth link or lever arm 104 and a pair of sixth links or pawls 106, 108. The lever arm 104 is pivotally carried by a pivot pin 110 connected to the side plates 42, 44 and the pawls 106, 108 are pivotally carried by the pivot pin 82 of the second pivot 56.

Figure 3:
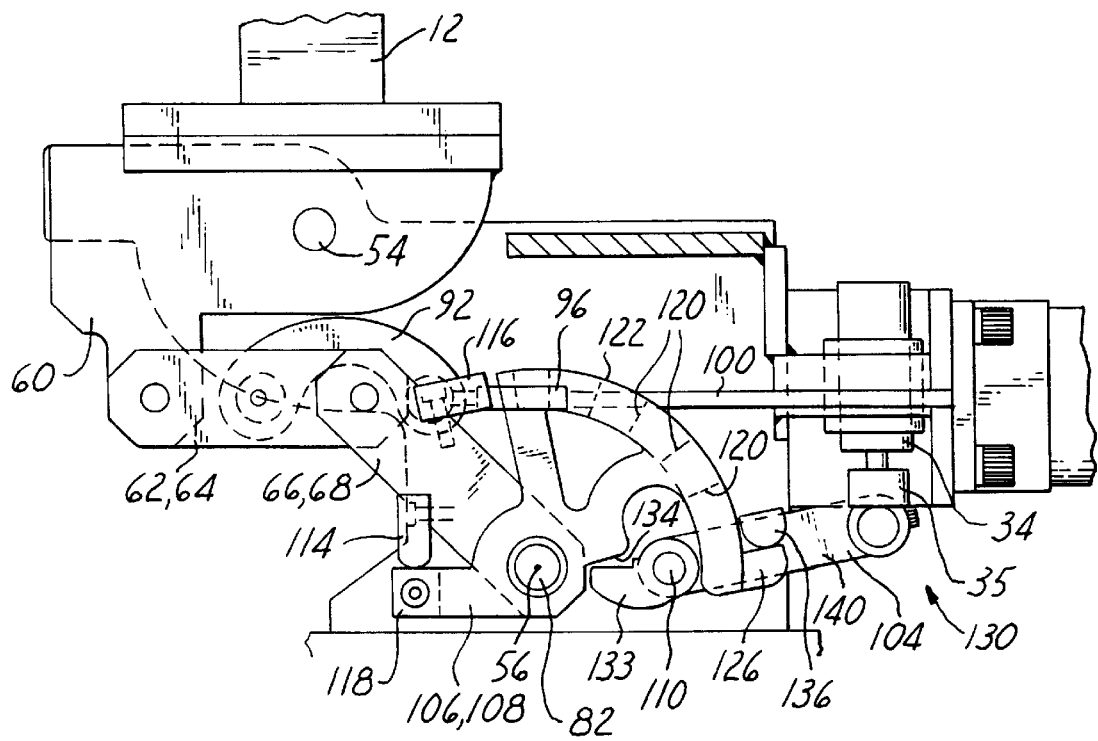
FIG. 3 is an enlarged fragmentary side view illustrating the modified Watts linkage and the engagement of the shock absorber when the actuator is in its fully extended position.
Figure 4:
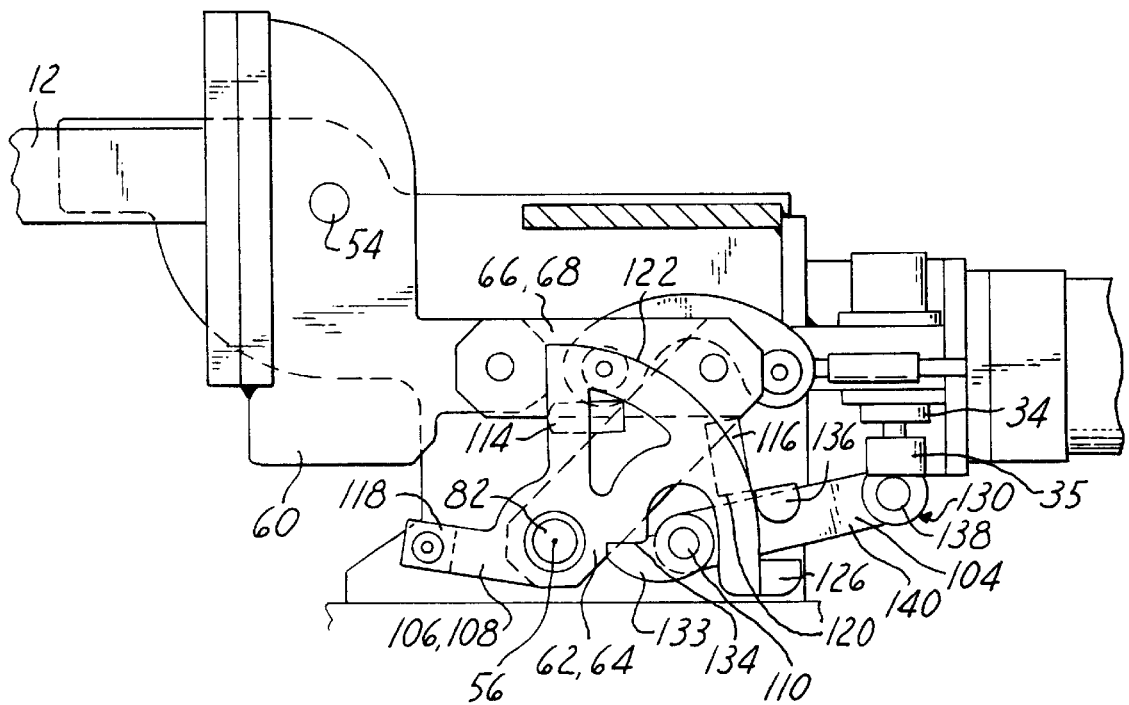
FIG. 4 is an enlarged fragmentary side view illustrating the modified Watts linkage and the engagement of the shock absorber when the actuator is in its fully retracted position.

As shown in FIG. 3, each third link 66, 68 is preferably provided with a pair of dogs 114, 116 attached to the third links 66, 68 and constructed to engage spaced apart stop surfaces 118, 120 on the pawls 106, 108. Each dog 114 contacts its corresponding stop surface 118 of the pawls 106, 108 when the air cylinder 26 moves the linkage assembly 28 adjacent its fully extended position as shown in FIG. 3. As shown in FIG. 4, each dog 116 contacts its corresponding stop surface 120 on the pawls 106, 108 when the air cylinder 26 retracts the linkage assembly 28 to its fully retracted position.

Figure 5:
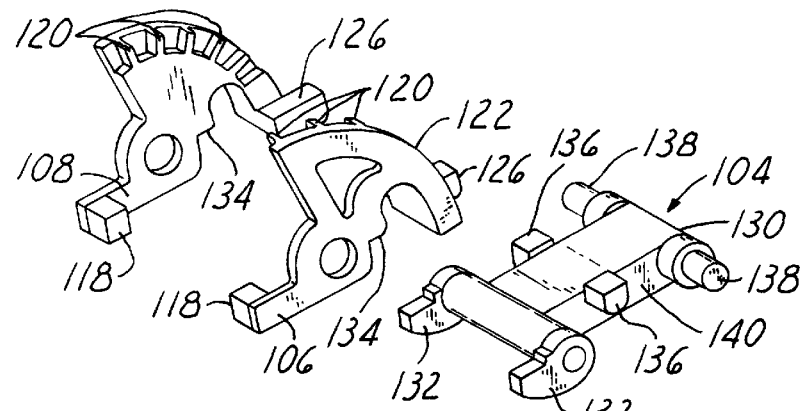
FIG. 5 is a perspective view illustrating the construction of the pawl and lever arm.

Each pawl 106, 108 preferably has a generally arcuate surface 122 as shown in FIG. 5 and is constructed with at least one and preferably several stop surfaces 120 disposed about the arcuate surface 122 which are capable of mating with a corresponding dog 116 of one of the third links 66, 68 along different points of the arcuate surface 122 of the pawls 106, 108. For a given desired point of termination of arcuate movement of the arm to its extended position and hence cushioning thereof, only the stop 120 in one arcuate location on each pawl will be used and thus, to provide clearance all preceding stops are machined away or cut-off to prevent premature engagement with the dogs 116 on the third links 66, 68. For actuating the shock absorber as the arm becomes fully retracted, each pawl 106, 108 also has a stop surface 126 adjacent the lower end of the arcuate surface 122 which is constructed to engage a follower on the lever arm 104 to actuate the shock absorber 34.

The lever arm 104 has a first free end 130 with a transverse pin providing a pair of spaced apart followers 138 each engagable with a plunger 35 of a shock absorber 34 and a second free end 132 with a pair of spaced apart dogs 133 each disposed under the abutment surfaces 134 of a pawl 106, 108 for engagement thereby to rotate the lever arm to actuate the shock absorbers 34. The lever arm also has another pair of spaced apart followers 136 each engagable by one of the dogs 126 on the pawls 106, 108 to rotate the lever arm to actuate the shock absorbers 34.

Preferably, a pair of shock absorbers 34 are used although in some applications a single shock absorber 34 may be used. Each shock absorber has a plunger 35 which is yieldably biased to its extended position. As already mentioned, each shock absorber can be biased by a spring or, alternatively, each shock absorber 34 can be a viscous fluid dampening type of absorber although other types of absorbers or cushions may be utilized in some applications.

In use, when the air cylinder 26 retracts the piston rod 100, the fourth link 92 pulls on the second links 62, 64 causing the first link 60 to rotate counterclockwise about the first pivot 54 and move the work arm 12 to its fully extended position. The movement of the second links 62, 64 also rotates the third links 66, 68 clockwise (as viewed in FIGS. 3 and 4) about the second pivot 56 whereupon the dogs 116 of the third links 66, 68 engage the stops 120 of the pawls 106, 108 to rotate the pawls 106, 108 clockwise about the second pivot 56. The abutment surfaces 134 of the pawls 106, 108 engage the dogs 133 of the lever arm 104 and rotate the lever arm 104 counterclockwise about its pivot point 110 to engage the followers 138 with the plungers 35 of the shock absorbers 34 to actuate them to cushion movement of the arm to its fully extended position.

Conversely, when the air cylinder 26 extends the piston rod 100 to its fully extended position the fourth link 92 advances the second links 62, 64 which rotate the first link 60 clockwise (as viewed in FIGS. 3 and 4) about the first pivot 54 and move the work arm 12 to its fully retracted or upright position. The movement of the second links 62, 64 in this direction rotates the third links 66, 68 counterclockwise about the second pivot 56 whereupon when the dogs 114 of the third links 66, 68 engage the stop surface 118 of the pawls 106, 108 they are rotated counterclockwise. This rotation of the pawls 106, 108 engages their dogs 126 with the followers 136 of the lever arm 104 to rotate the lever arm 104 counterclockwise to move the plungers 35 of the shock absorbers 34 to actuate them to cushion movement of the arm to its fully retracted position.

Figure 6:
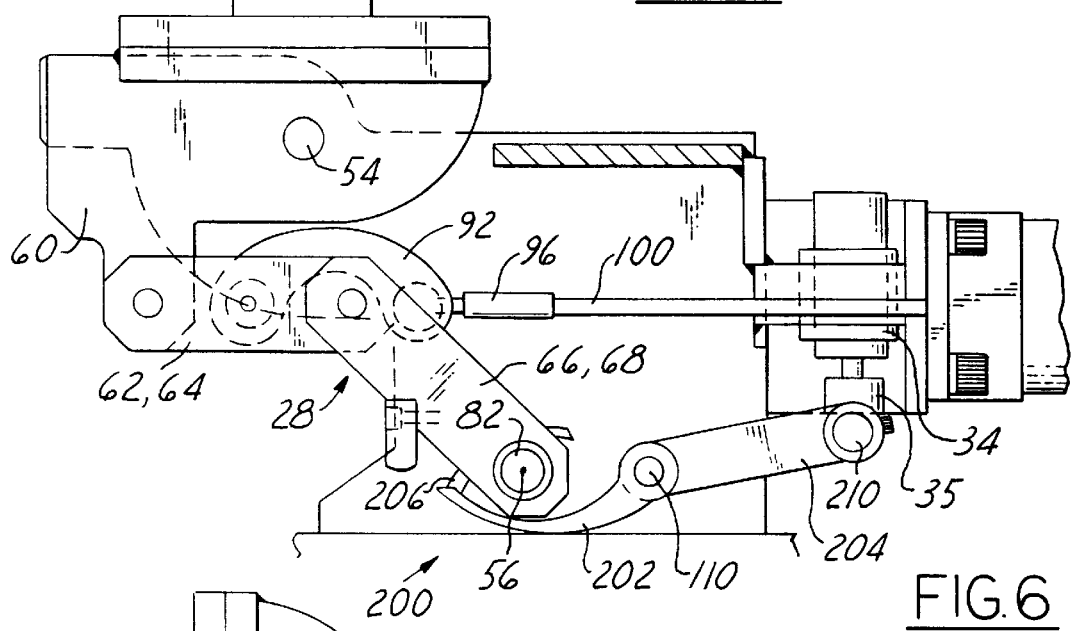
FIG. 6 is an enlarged fragmentary side view of an alternate embodiment illustrating the linkage assembly adjacent its fully extended position.
Figure 7:
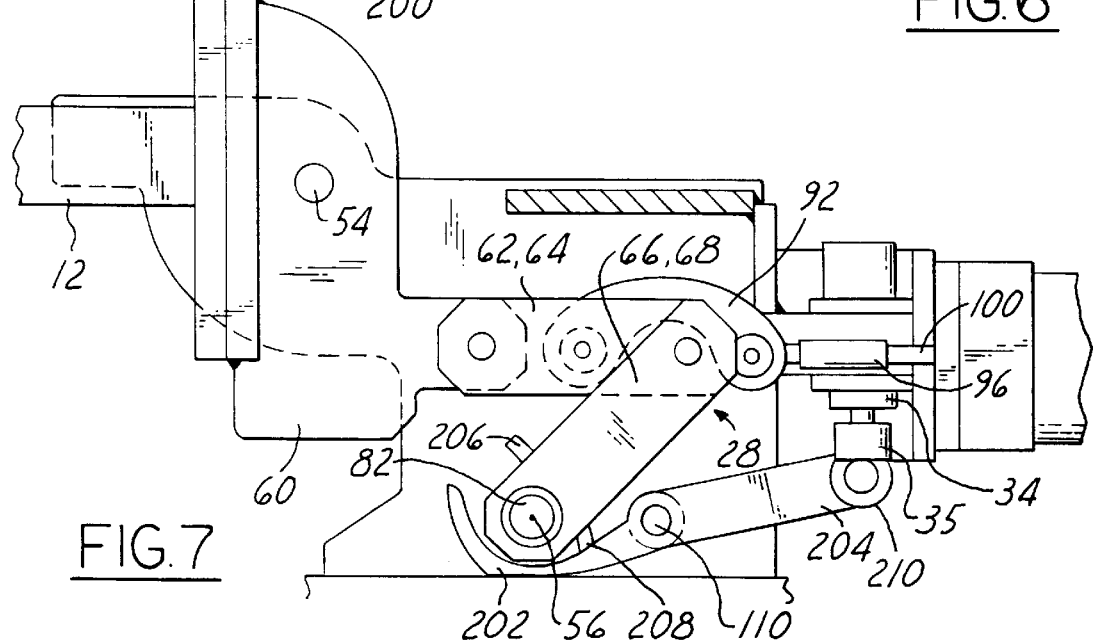
FIG. 7 is an enlarged fragmentary side view illustrating the linkage assembly of FIG. 6 adjacent its fully retracted position.

In an alternate embodiment 200, as shown in FIGS. 6 and 7, the second free end 202 of the lever arm 204 extends adjacent to the second pivot 56 and the third links 66, 68 have a pair of dogs 206, 208 each engagable with the second free end 202 of the lever arm 204. The dogs 206, 208 on the third link 66, 68 are disposed such that one dog 206 engages the second free end 202 when the linkage assembly 28 is adjacent its fully extended position as shown in FIG. 6, and the other dog 208 engages the second free end 202 when the linkage assembly 28 is adjacent its fully retracted position as shown in FIG. 7. When each dog 206, 208 engages the second free end 202 of the lever arm 204, the lever arm 204 is rotated counterclockwise about its pivot 110 to engage its followers 138 with the plungers 35 of the shock absorbers 34 and provide shock absorption or cushioning adjacent the fully extended and fully retracted linkage assembly 28 and work arm 12 positions.

Thus, in each embodiment of this invention, smooth movement of the work arm 12 adjacent both its fully extended and fully retracted positions is accomplished by actuating the same shock absorber(s) 34 in the same direction. This reduces wear on the system and helps to improve the reliability and durability of the system in use. The power work arm 12 also uses a simple and readily available linear actuating means to couple and drive the linkage assembly 28 which has short links contained in a relatively small housing 30. This provides a self contained package which is compact, may be a standardized unit and produces a simple arcuate motion of a tool mounted at the end of the work arm 12.

I claim:

1. A power work arm device comprising:

a housing;

a work arm pivotally connected to the housing and pivotally movable to fully extended and retracted positions of the work arm;

an actuator adjacent to the housing and providing motion along a linear path to actuate the work arm from the fully retracted position to the fully extended position of the work arm;

a linkage assembly operably connecting the work arm with the actuator for pivotal movement of the work arm between the fully extended and retracted positions of the work arm;

a shock absorber carried by the housing;

a first link pivotally carried by the housing and having a pair of ends spaced apart on opposite sides of the pivot point of the first link with one of the ends engaging the shock absorber in one direction of a pivotal movement of the first link to actuate the shock absorber;

at least one second link pivotally carried by the housing adjacent to the first link and engaging the first link adjacent one side of the pivot of the first link to engage the first link with the shock absorber to actuate the shock absorber when the work arm is adjacent the fully retracted position and the second link engaging the first link adjacent the other side of the pivot of the first link when the work arm is adjacent the fully extended position to engage the first link with the shock absorber to actuate the shock absorber, and a lost motion coupling operably connecting the actuator with the second link to actuate the shock absorber as the work arm moves to both the fully extended position and the fully retracted position.

2. The power work arm device of claim 1 wherein the second link is at least one pawl, wherein at least one dog engages the pawl when the work arm is adjacent the fully retracted and fully extended work arm positions to pivot the pawl and engage the first link with the shock absorber.

3. The power work arm device of claim 1 wherein the linkage assembly comprises at least one third link pivotally carried by the housing, at least one fourth link pivotally connected with the third link, at least one fifth link pivotally connected with the fourth link and with the housing and at least one coupling pivotally connected adjacent the mid point of the fourth link and with the actuator at a point spaced from the mid point of the fourth link.

4. The power work arm device of claim 3 wherein the pivot point between the third link and the housing is on an opposite side of an axis defined by the linear path of the actuator as the pivot point between the fifth link and the housing.

5. The power work arm device of claim 1 wherein the first link has a follower operatively engaging the second link when the work arm is adjacent the fully retracted position.

6. The power work arm device of claim 1 which comprises a second shock absorber, the shock absorbers are disposed adjacent to each other and actuated in the same direction by the first link.

7. The power work arm device of claim 1 wherein the second link has a first follower positioned to be engaged by the linkage assembly when the work arm is adjacent the fully retracted position and a second follower positioned to be engaged by the linkage assembly when the work arm is adjacent the extended position.

8. The power work arm device of claim 3 wherein the fifth link is adapted to engage the second link to cause the first link to actuate the shock absorber.

9. A power work arm device comprising:

a housing;

a work arm pivotally connected to the housing and pivotally movable between fully extended and fully retracted positions;

an actuator adjacent to the housing and providing motion along a linear path to actuate the work arm from the fully retracted position to the fully extended position of the work arm;

a linkage assembly operably connecting the work arm with the actuator for pivotally moving the work arm between the fully extended and retracted positions;

a shock absorber carried by the housing;

a first link pivotally carried by the housing and having a first end engagable with the shock absorber in one direction of the pivotal movement of the first link and a second end spaced from the first end with the pivot point of the first link disposed between the first and second ends; and a lost motion coupling operably connecting the actuator with the first link when the work arm is adjacent the fully extended position to actuate the shock absorber and when the work arm is adjacent the fully retracted position to actuate the shock absorber.

10. The power work arm device of claim 9 wherein the linkage assembly comprises at least one second link pivotally carried by the housing, at least one third link pivotally connected with the second link, at least one fourth link pivotally connected with the third link and with the housing and at least one coupling pivotally connected adjacent the mid point of the third link and with the actuator at a point spaced from the mid point of the third link.

11. The power work arm device of claim 10 wherein the second link has a pair of dogs on opposite sides of the second link, one dog engages the second end of the first link when the work arm is adjacent the fully retracted position and the other dog engages the second end of the first link when the work arm is adjacent the fully extended position.

* * * * *